Sept. 29, 1936.   M. C. HUFFMAN   2,055,898
IMPACT TOOL
Filed Dec. 15, 1930
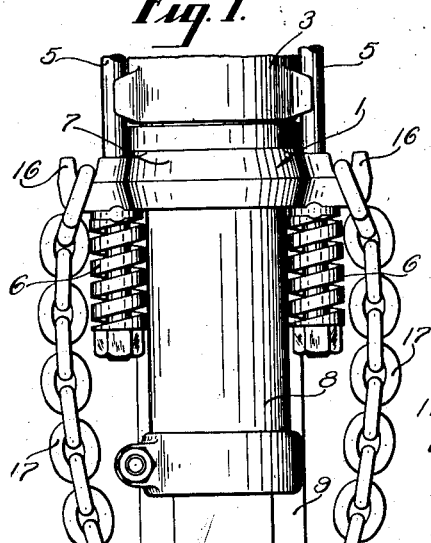
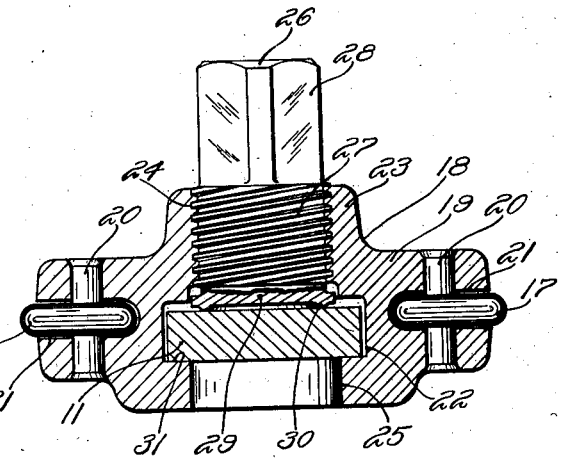
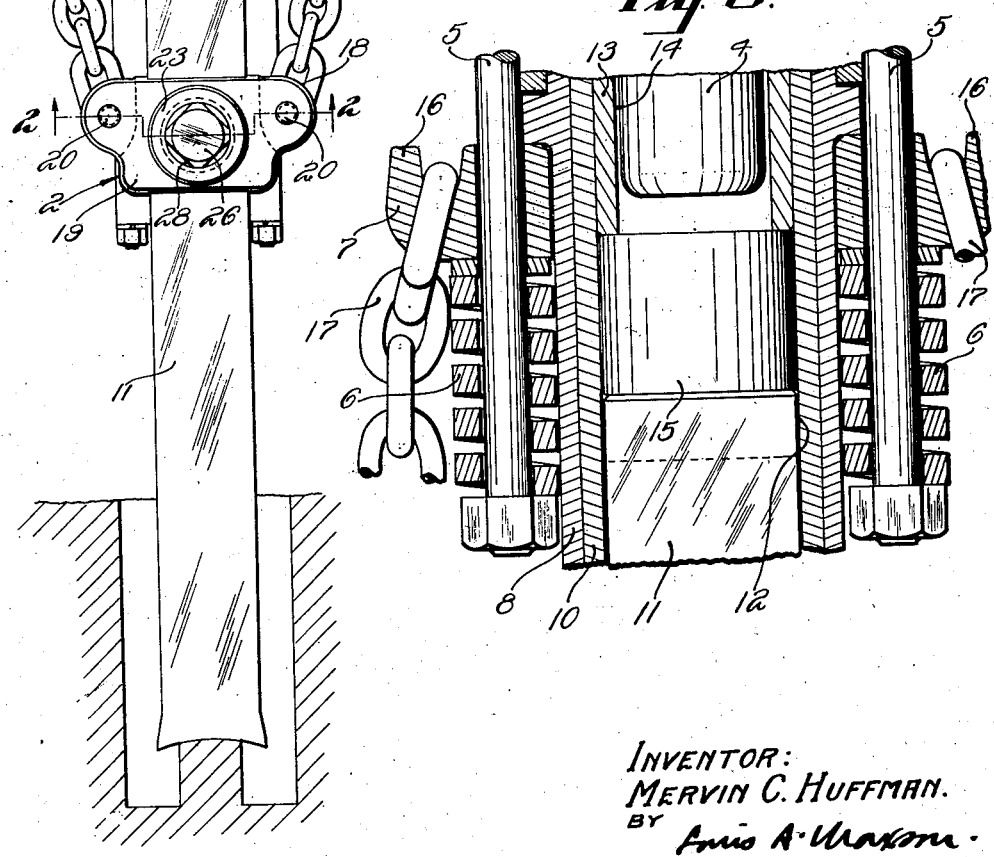
INVENTOR:
MERVIN C. HUFFMAN.
BY
ATT'Y.

Patented Sept. 29, 1936

2,055,898

UNITED STATES PATENT OFFICE 2,055,898

IMPACT TOOL

Mervin Chester Huffman, Claremont, N. H., assignor to Sullivan Machinery Company, a corporation of Massachusetts Application December 15, 1930, Serial No. 502,439

8 Claims. (Cl. 121—32)

This invention relates to impact tools, and more particularly pertains to improved retaining means for the working implements of such tools.

An object of the invention is to provide an improved retaining means for the working implement of an impact tool. Another object is to provide an improved retaining means having an improved attaching device for the working implement of an impact tool. A further object is to provide an improved retaining means having an improved attaching device for the broaching steel of a broaching tool. A still further object is to provide an improved retaining means for the working implement of an impact tool having provided therein means attaching the same to the tool. These and other objects and advantages of this invention will however hereinafter more fully appear. In the accompanying drawing there is shown for purposes of illustration one embodiment which the invention may assume in practice. In the drawing—

Fig. 1 is a view of the forward end of an impact tool having the illustrative form of the improved retaining means associated therewith;

Fig. 2 is a transverse sectional view through the improved attaching means for the working implement, the section being taken on line 2—2 of Fig. 1; and, Fig. 3 is an axial section taken near the upper part of Fig. 1 and parallel to the plane of the drawing.

In the illustrative construction there is shown the forward end of a percussive broaching tool generally designated 1 having incorporated therewith the illustrative form of the improved broaching steel retaining means generally designated 2, for maintaining the steel in the tool during the working operation, or when withdrawing the steel from the hole. The broaching tool, as shown in the drawing, includes a motor cylinder 3 and reciprocably mounted in this cylinder is a pressure fluid actuated hammer piston (not shown) having a forwardly projecting striking bar 4. Secured to the cylinder 3 by side rods 5 and springs 6 acting upon a collar 7 is a chuck housing 8. The side rods 5 and springs 6 maintain the cylinder, collar, chuck housing and other parts of the broaching tool in assembled relation in an obvious manner. The tool 1 is slidably mounted in a shell 9 and is adapted to be fed in the shell by a manual feed screw (not shown). Mounted within the chuck housing 8 is a chuck sleeve 10 having a rectangular opening which slidably receives a flat rectangular shaped broaching steel 11. The chuck sleeve 10 has a bore 12, and fitting this bore at its rearward end is a bushing 13 which has a bore 14 slidably receiving the striking bar 4. Interposed between the bushing 13 and the broaching steel 11, and slidably mounted in the bore 12 of the chuck sleeve is a striking block 15. During operation of the broaching tool the striking bar of the hammer piston strikes repeatedly against the striking block 15 which transmits the impact blows to the broaching steel, driving it forwardly into the work.

To prevent the steel from being driven from the tool during normal operation, or when a soft spot is encountered, or to maintain the steel in the tool when withdrawing it from the hole, the improved steel retaining means generally designated 2 has been provided. It will herein be noted that the collar 7 has hook shaped portions 16 having attached thereto flexible members herein shown in the form of chains 17, but which may comprise cables or other suitable devices. Attached to the other ends of these chains is an improved clamping device 18 for maintaining the steel in the broaching tool, and this clamping device herein comprises a body 19 having pins 20 and slots 21 adapted to receive one end of the chains 17. Extending longitudinally through the body 19 is a substantially rectangular shaped opening 22 which receives the broaching steel 11, but herein of an area greater than the cross section of the broaching steel. One side of the body 19 has an enlarged portion or boss 23 which has extending transversely therethrough an internally threaded bore 24 terminating at its inner end short of the rectangular shaped opening 22 in an enlarged bore 25 which has at the other side of the body 19, beyond the rectangular shaped opening 22, a continuation opening through the side of the body. A clamping bolt herein designated 26 is inserted through the enlarged bore 25 and has threads 27 adapted to cooperate with the threaded bore 24. This clamping bolt 26 has a bolt head 28 formed on one end thereof to receive a wrench or other suitable means for turning the clamping bolt relative to the body 19. Herein formed integrally with the clamping bolt 26, and remote from the head portion 28, is an annular portion 29 which is larger in diameter than the bolt 26, so that it cannot pull out through the threaded bore 24 when in assembled position, but smaller than the bore 25 to permit insertion of the bolt through this bore. The annular member 29 has a ring shaped gripping portion 30 which is V-shaped in cross section, and is adapted to firmly grip the broaching steel and to hold it rigidly relative to the clamp. It will herein be noted that as the clamping bolt is tightened the ring shaped portion 29 engages the steel, forcing the steel against a shoulder 31 formed on one side of the opening 22 after which the collar portion on the bolt 26 rigidly clamps the improved clamping device to the broaching steel.

In the use of the improved broaching tool, it will be noted that during the broaching operation the striking bar 4 of the hammer piston strikes repeatedly against the striking block 15 which transmits the impact blows to the broaching steel thereby driving the steel forwardly to effect its cutting operation, it being understood that as the cut is deepened the broaching tool is fed forwardly along its guide shell. The chains attached to the clamping member 18 are of a sufficient length to permit axial movement of the steel relative to the chuck during the broaching operation. If a cavity or soft spot in the material is penetrated driving the steel forwardly at a quick movement, the excessive shocks caused by the hammering of the impact transmitting means against the steel are absorbed by the retainer springs 6. After the broaching operation has been completed, the broaching tool is fed rearwardly in its guide shell 9 and the improved steel retaining means then serves as a steel puller and pulls the steel from the cut.

As a result of this invention it will be seen that an improved resiliently supported retaining means for the broaching steel of a broaching tool is provided which is of an extremely simple and rugged construction and can be easily and quickly attached to the broaching steel of such tools for maintaining the broaching steel in the tool both during the broaching operation and when pulling the steel from the cut.

While there is in this application specifically described one form which this invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination with an impact tool including a chuck housing having a chuck for receiving the shank of a working implement and a resiliently positioned collar separate from and surrounding the chuck housing for maintaining the chuck housing in position on the tool, of means for retaining the working implement in the chuck including a retainer member rigidly secured to the working implement intermediate the ends of the latter, and flexible connections attached to said collar and said retainer member for loosely connecting the latter to the tool, said collar through said flexible connections absorbing the shocks imparted to said retainer member by said working implement during retraction of the implement from its work.

2. The combination with an impact tool including a chuck housing having a chuck for receiving the shank of a working implement and a resiliently positioned collar separate from and surrounding the chuck housing for maintaining the chuck housing in position on the tool, of means for retaining the working implement in the chuck including a member embracing the working implement intermediate the ends of the latter and having means for rigidly securing the same to the working implement, and flexible side chains attached to said retainer member and having detachable connection with said collar for loosely connecting said member to the tool, said collar through said flexible side chains absorbing the shocks imparted to said retainer member by said working implement during retraction of the implement from its work.

3. The combination with an impact tool having a plurality of parts including a chuck housing having a chuck for receiving the shank of a working implement, and means for yieldably maintaining the parts thereof in assembled relation including a collar separate from and surrounding the chuck housing and side rods and springs acting on said collar, of means for retaining the working implement in the chuck including a clamp member attached to the working implement intermediate the ends of the latter and flexible elements attached to said clamp member and having detachable connection with said collar for loosely connecting said member to the tool, said collar through said flexible elements absorbing the shocks imparted to the clamp member by the working implement during retraction of the implement from its work.

4. The combination with an impact tool having a plurality of parts including a chuck housing having a chuck for receiving the shank of a working implement, and means for yieldably maintaining the parts thereof in assembled relation including a collar separate from and surrounding the chuck housing and side rods and springs acting on said collar, of means for retaining the working implement in the chuck including a clamp member attached to the working implement intermediate the ends of the latter, and flexible elements attached to said clamp member and having detachable connection with said collar for loosely connecting said member to the tool, said collar having hook-shaped portions thereon and said flexible elements having portions detachably connected to said hook-shaped portions, said collar through said flexible elements absorbing the shocks imparted to the clamp member by the working implement during retraction of the implement from its work.

5. The combination with an impact tool including a chuck housing having a chuck for receiving the shank of a rectangular broaching steel, of steel puller means for said steel including a puller frame having a rectangular opening for receiving in an endwise direction the steel body, gripping means secured to the puller frame for rigidly securing the frame to the steel in the desired position longitudinally of the latter and including a gripping element movable transversely of said rectangular steel receiving opening and having means cooperating therewith for moving said gripping element transversely of the steel for gripping the latter and means precluding withdrawal of said gripping member from said puller frame by movement away from said rectangular opening in a direction to release the puller frame from the steel, said puller frame having lateral perforated ears, and flexible side chains connected to said ears for attaching the puller frame to the forward end of the impact tool, said side chains permitting movement of the puller frame with the steel during the broaching operation while limiting movement of the steel in one direction.

6. The combination with an impact tool including a chuck housing having a chuck for receiving the shank of a working implement and a resiliently positioned collar separate from and surrounding the chuck housing for maintaining the chuck housing in position on the tool, of means for retaining the working implement in the chuck including a retainer member rigidly secured to the working implement intermediate the ends of the latter, and connections attached to said collar and said retainer member for loosely connecting the latter to the tool, said collar through said connections absorbing the shocks imparted to said retainer member by said working implement during retraction of the implement from its work.

7. The combination with an impact tool having a plurality of parts including a chuck housing having a chuck for receiving the shank of a working implement, and means for yieldably maintaining the parts thereof in assembled relation including a collar separate from and surrounding the chuck housing and side rods and springs acting on said collar, of means for retaining the working implement in the chuck including a clamp member attached to the working implement intermediate the ends of the latter and elements attached to said clamp member and having detachable connection with said collar for loosely connecting said member to the tool, said collar through said elements absorbing the shocks imparted to the clamp member by the working implement during retraction of the implement from its work.

8. The combination with an impact tool having a plurality of parts including a chuck housing having a chuck for receiving the shank of a working implement, and means for yieldably maintaining the parts thereof in assembled relation including a collar separate from and surrounding the chuck housing and side rods and springs acting on said collar, of means for retaining the working implement in the chuck including a clamp member attached to the working implement intermediate the ends of the latter, and elements attached to said clamp member and having detachable connection with said collar for loosely connecting said member to the tool, said collar having hook-shaped portions thereon and said elements having portions detachably connected to said hook-shaped portions, said collar through said elements absorbing the shocks imparted to the clamp member by the working implement during retraction of the implement from its work.

MERVIN CHESTER HUFFMAN.